United States Patent [19]
Stauter et al.

[11] 4,028,463
[45] June 7, 1977

[54] RECOVERY OF MANGANESE VALUES

[75] Inventors: John C. Stauter, Itasca; Richard T. Um, Mount Prospect, both of Ill.

[73] Assignee: UOP Inc., Des Plaines, Ill.

[22] Filed: Feb. 19, 1976

[21] Appl. No.: 659,392

[52] U.S. Cl. .................................. 423/52; 423/49; 423/54; 423/57; 75/115; 75/116

[51] Int. Cl.² .................................. C01G 45/10

[58] Field of Search .................. 423/49, 52, 54, 57; 75/115, 116

[56] References Cited

UNITED STATES PATENTS

| | | | |
|---|---|---|---|
| 1,279,110 | 9/1918 | Haslup | 423/52 |
| 2,176,774 | 10/1939 | Sweet et al. | 75/115 |
| 2,601,306 | 6/1952 | Lloyd et al. | 75/115 |
| 3,082,080 | 3/1963 | Simons | 423/52 |
| 3,085,875 | 4/1963 | McCarroll | 423/49 |
| 3,106,451 | 10/1963 | Globus | 423/49 |
| 3,244,513 | 4/1966 | Zubryekyj et al. | 75/115 |
| 3,906,075 | 9/1975 | Menz | 423/52 |

FOREIGN PATENTS OR APPLICATIONS 798,326 7/1958 United Kingdom .................. 423/54

OTHER PUBLICATIONS

Adam et al., "Talanta", vol. 18, 1971, pp. 91–95.

*Primary Examiner*—Herbert T. Carter
*Attorney, Agent, or Firm*—James R. Hoatson, Jr.; Raymond H. Nelson; William H. Page, II

[57] ABSTRACT

Manganese values may be recovered from manganese bearing sources by subjecting said source to a roast in the presence of sulfuric acid and a reductant which comprises a chromium-containing compound at temperatures ranging from about 200° to about 500° C. followed by leaching, separation, solvent extraction or ion exchange whereby manganese is extracted, followed by separation and recovery of the manganese.

4 Claims, 1 Drawing Figure

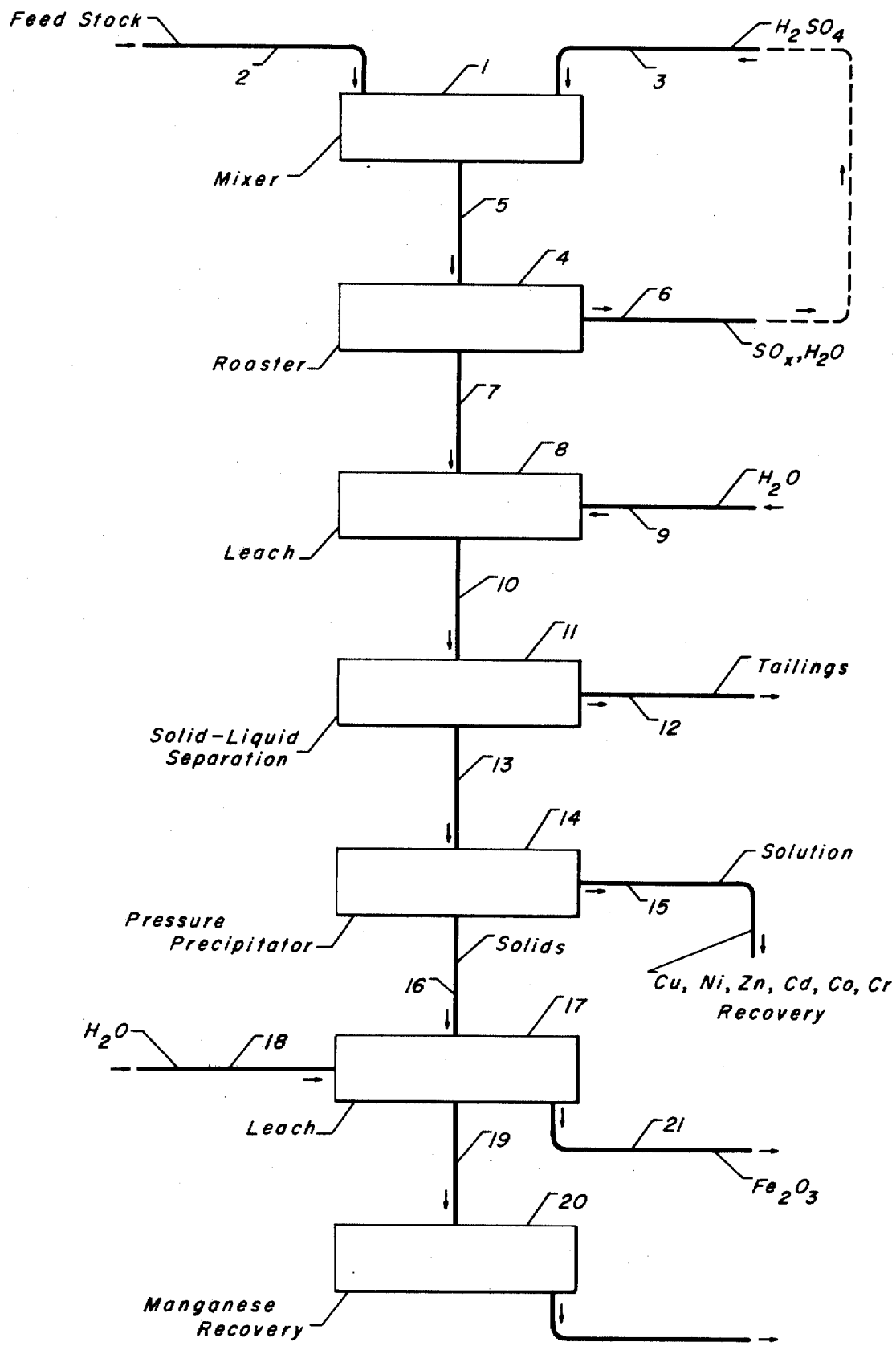

RECOVERY OF MANGANESE VALUES

BACKGROUND OF THE INVENTION

The element manganese which is considered essential for plants and animals is in high demand in industry as a whole. For example, manganese is used as a purifying and scavenging agent in the production of several metals such as iron, copper, chrome, nickel, aluminum alloys, alloy steels, etc., as well as being a source of manganese chemicals. Examples of manganese chemicals which find a wide variety of uses in the chemical industry include manganese acetate which is used in textile dyeing, as a catalyst in various chemical processes involving oxidation, in leather tanning and finishing, in paints and varnishes, etc., or manganese carbonate which is used in medicine, paint pigments, fertilizers, etc. These two manganese chemicals are only representative of the various types of manganese compounds which are used. One source of manganese metal is manganese dioxide, the natural form of which is pyrolusite. Another source of manganese which, up to the present time, has not been fullyexploited is from sea nodules. Sea nodules are metal oxide masses which are found on the floor of various oceans and comprise mixtures of metals, the major components of these nodules being manganese and iron along with smaler amounts of nickel, copper, cobalt, zinc and cadmium. The processing of these sea nodules to recover the manganese as well as the iron, copper, nickel, cobalt, cadmium, etc., requires the presence of a reducing reagent in order to effectively recover the desired metal values. In the prior art these reducing agents have usually included sulfur dioxide, carbon monoxide, hydrogen, etc. As will hereinafter be shown in greater detail, it has now been discovered that manganese values may be recovered from manganese dioxide as well as from sea nodules along with other metal values which are present in said sea nodules in relatively high yields by subjecting the manganese bearing source to a roast in the presence of sulfuric acid and a reductant of a specific type which contains chromium.

This invention relates to a process for the recovery of manganese values from a manganese bearing source. More specifically, the invention is concerned with an improvement in a process for obtaining maximum manganese values from a manganese bearing source such as sea nodules in a series of steps hereinafter set forth in greater detail.

As was previously discussed, prior art methods for obtaining manganese from sources such as sea nodules required, in some instances, a reducing agent such as sulfur dioxide, carbon monoxide, hydrogen, etc., which were in gaseous form. The use of these gases as reducing agents required relatively complicated and expensive equipment including the use of pressure-resistant vessels in which to effect the recovery of the metal. In contradistinction to this, it has now been discovered that relatively high yields of manganese values may be obtained from manganese bearing sources by treating said manganese bearing source with an acid in the presence of a reductant which contains chromium followed by separation and extraction in a series of steps whereby a practically quantitative yield of the manganese in the manganese bearing source may be recovered.

It is therefore an object of this invention to provide a process for obtaining manganese from a manganese bearing source.

More specifically the invention is concerned with an improvement in a process for obtaining manganese from a manganese bearing source whereby the desired metal may be recovered in a substantially greater yield than has heretofore been possible.

In one aspect an embodiment of this invention resides in a process for the recovery of manganese values from a manganese bearing source which comprises subjecting said manganese bearing source to a roast in the presence of sulfuric acid and a reductant comprising a chromium-containing compound at an elevatated temperature, leaching the resulting pulp with water, filtering the leach solution to separate undissolved solids and pregnant leach liquor containing dissolved manganese ions and chromium ions, subjecting said pregnant leach liquor to solvent extraction with an organic solvent to selectively extract said chromium ion, separating the aqueous phase containing manganese ions from said organic phase, and recovering the manganese from said aqueous phase.

A specific embodiment of this invention is found in a process for the recovery of manganese values from a manganese bearing source which comprises subjecting sea nodules to a roast in the presence of sulfuric acid and chromite ore at a temperature in the range of from about 200° to 500° C., leaching the resulting pulp with water, filtering the leached solution to recover a pregnant leach liquor containing dissolved manganese ions and chromium ions, subjecting the pregnant leach liquor to solvent extraction with an organic amine solvent to selectively extract the chromium ion, separating the aqueous phase containing manganese ions from the organic phase containing the chromium ions, subjecting said aqueous phase to an elevated temperature and pressure to precipitate manganese sulfate, filtering the resultant precipitate, leaching the precipitate to solubilize the manganese sulfate and separating said solubilized manganese from undissolved solids such as iron oxide.

Other objects and embodiments will be found in the following further detailed description of the present invention.

As hereinbefore set forth, the present invention is concerned with an improved process for the recovery of manganese values from a manganese bearing source such as manganese dioxide or sea nodules. In the process of this invention the manganese bearing source is combined with a reductant comprising a chromium-containing compound, a specific example of the chromium bearing compound being chromite ore. The use of chromite ore is desired due to its relatively greater availability and subsequent lower cost. The composition of the feedstock is accomplished by grinding the two components by means of a ball mill or any other method known in the art to a size preferably less than about 65 mesh (Tyler). The two components are then admixed after being ground to the desired size and thereafter pugged with concentrated sulfuric acid. By utilizing a feedstock comprising a mixture of sea nodules or manganese dioxide with a chromium-containing compound, it is possible to obtain a synergistic effect inasmuch as, as hereinbefore set forth, the manganese requires a reducing agent for optimum extraction, said reduction properties being afforded by the presence of the chromium-containing compound such as chromite ore. In the preferred embodiment of the invention the three components, namely, the manganese bearing source, the chromium-containing compound and the sulfuric acid are present in the mixture in a weight ratio ranging from about 1:1:1 to about 2:1:10 weight percent of manganese bearing source, chromium-containing compound and sulfuric acid respectively. In the preferred embodiment of the invention, concentrated sulfuric acid (about 90%) constitutes the acidic portion of the mixture, although it is also contemplated that sulfuric acid solutions containing less than the concentrated amount may also be utilized. While, as hereinbefore set forth, in the preferred embodiment of the invention, the manganese bearing source and the chromium-containing compound are present in a 1:1 weight ratio, it is also contemplated within the scope of this invention that the manganese bearing source will be present in a weight excess over that of the chromium-containing compound, said weight excess being in a range of from about 1.1:1 up to about 2:1 weight percent of manganese bearing source to chromium-containing compound. The pugged mixture of the three components is then placed in an appropriate vessel such as a pot furnace and subjected to a baking operation or roast which is effected in a range of from about 200° to about 500° C. and preferably at a temperature in the range of from about 350° to about 400° C. for a period of time sufficient to remove a major portion of the water content plus excessive sulfuric acid, the latter being fumed off during the reaction and, if so desired, recovered for admixture to form additional sulfuric acid. The aforesaid heating step is effected for a period of time ranging from about 5 minutes to about 30 minutes or more depending upon the temperature of the baking step and the amount of water and acid which is to be withdrawn. The aforesaid baking or roasting of the mixture will be effected until the mixture of manganese bearing source and chromium-containing compound is still in a damp state.

Upon completion of the baking or roasting step, the mixture is then leached with a sufficient amount of water and subjected to agitation for a period of time ranging from about 0.5 to about 4 hours or more while maintaining the temperature of the solution in a range of from about 25° to about 95° C. Following completion of the leaching step, the resulting solution is then subjected to a separation step such as filtration, decantation, etc., whereby the undissolved solids which comprise tailings are separated from the pregnant leach liquor, the latter containing dissolved manganese ions as well as dissolved chromium ions from the chromium-containing reductant compound. The pregnant leach liquor solution which may also contain other dissolved metal ions such as copper, nickel, cobalt, zinc, cadmium, etc., when the manganese bearing source comprises sea nodules is then treated for specific metal recovery of species other than manganese and iron or placed in an appropriate pressure-resistant apparatus. In this apparatus the pregnant leach liquor is subjected to superatmospheric pressures ranging from about 50 pounds per square inch to about 500 pounds per square inch as well as an elevated temperature in the range of from about 130° to about 250° C. The elevated temperature and pressure will precipitate the manganese as solid manganese sulfate. In addition, the iron which is also present will precipitate as ferric oxide. Upon completion of the desired precipitation time which may range from about 0.5 to about 4 hours or more in duration, the solid precipitates are separated from the liquids by any means known in the art such as filtration. The liquid portion of the solution will contain the dissolved chromium, copper, nickel, cobalt, cadmium, zinc, etc., metals if not earlier extracted or which may thereafter be recovered by solvent extraction. For example, the chromium may be selectively extracted by the use of tertiary amine compounds such as trimethyl amine, tributyl amine, tricapryl amine, etc., while the copper, nickel and cobalt which may be present are subjected to solvent extraction utilizing organic solvents of the hydroxy oxime type and thus ma be selectively removed and recovered while the zinc and cadmium remain in the aqueous portion of the mixture. The aforementioned zinc and cadmium may then be recovered by any means known to those skilled in the art.

The solids resulting from the pressure precipitation of the pregnant leach liquor after separation from the aqueous liquid solution are then further leached, after being allowed to return to ambient temperature and pressure by treatment with an additional amount of water. After leaching the solution at ambient temperature and pressure for a period of time ranging from about 0.5 up to about 4 hours or more, the manganese sulfate which has returned to solution is separated from the ferric oxide which remains in solid form. This separation, as in the case of other separations hereinbefore set forth, is accomplished by filtration, decantation, etc., whereby the manganese sulfate is recovered in soluble form and treated by any means known in the art to recover the manganese in the form of metal or compound.

The present invention will be further illustrated with reference to the accompanying drawing which schematically illustrates a simplified flow diagram of the process of the present invention. However, it is to be understood that the flow diagram is in schematic form only and that all valves, condensers, pumps, controllers, etc., have been omitted as not being essential to the complete understanding of this invention. The utilization of these, as well as other similar appurtenances, will be obvious as the drawing is described. In the drawing a feedstock comprising a manganese bearing source such as sea nodules, manganese ore, manganese dioxide, etc., and the reductant compound comprising chromite ore or any other chromium-containing compound such as chromium sulfate, chromium oxide, etc., are charged to a mixer 1 through line 2. In addition, the acid portion of the mixture comprising, in the preferred embodiment of the invention, concentrated sulfuric acid, is also charged to mixer 1 through line 3. After the mixture has been pugged, it is charged to the roaster 4 through line 5. In roaster 4 the mixture is baked for a period of time within the range hereinbefore set forth until a sufficient amount of water and sulfur oxides has been withdrawn through line 6 so that the mixture is in a caked form but still retains a sufficient amount of acid to avoid being completely dry. As illustrated in this drawing, the mixture of water and sulfur oxide compounds may be recycled to mixer 1 through line 3 after being treated in an apparatus not shown in the drawing to form the desired sulfuric acid. The aforesaid mixture of roasted manganese bearing source and chromium-containing compound is withdrawn from roaster 4 through line 7 and passed to a leaching apparatus 8 wherein the solid mixture is leached with water which is charged to leching means 8 through line 9. The leaching means wherein the mixture undergoes leaching is provided with heating means, also not shown, in order that the leach may be effected at temperatures ranging from about 25° to about 95° C. After leaching the mixture for the predetermined period of time, the solution containing undissolved solids is withdrawn from leaching means 8 through line 10 and passes to separation means 11 wherein the pregnant leach liquor is separated from undissolved solids. The undissolved solids which comprise tailings withdrawn from separation means 11 through line 12. The separation means 11 may comprise vacuum filters, pressure filters, or any other means known in the art. The pregnant leach liquor is withdrawn from separation means 11 through line 13 and passed to a pressure-resistant apparatus 14 wherein the pregnant leach liquor is subjected to elevated temperatures and pressures thereby precipitating the manganese ion as manganese sulfate and, in addition, also precipitating any iron which may be present as ferric oxide. After precipitation of the manganese and iron compounds, the liquor portion mixture is withdrawn through line 15, said liquid portion contains any dissolved chromium, copper, nickel, cobalt, zinc and cadmium metals which may have been present in the feedstock. These latter metals are then recovered by means hereinbefore set forth in greater detail. It is also contemplated within the scope of this invention, as an alternative method of separation, that the pregnant leach liquor may be withdrawn from separation means 11 and treated with organic solvents of the type hereinbefore set forth in order to separate and recover the extraneous metal values prior to precipitation of the manganese and iron pressure-resistant apparatus 14. The solid precipitate comprising the mixture of manganese sulfate and ferric oxide is withdrawn from precipitation means 14 through line 16 and passed to a second leaching means 17. In leaching means 17 the solids, after being returned to ambinet temperature and pressure are leached with water which is charged to leaching means 17 through line 18. After being leached at ambient temperature and pressure for a period of time ranging from about 0.5 to about 4 hours or more, the manganese sulfate which has dissolved in the leach liquor is withdrawn through line 19 and passed to manganese recovery means 20 whereby the desired manganese metal or compound may be obtained while the solid ferric oxide is removed from leaching means 17 through line 21 and passed to storage or disposal.

The recovery of manganese from the manganese sulfate solution can be effected in any suitable manner known in the art. For example, the manganese sulfate solution can be processed by electrowinning whereby the manganese can be obtained in metallic form or alternatively the manganese sulfate solution can be treated with alkali metal or alkaline earth metal oxide and air whereby the manganese is oxidized to form manganese dioxide which can then be recovered as such and utilized in various processes in the chemical industry.

The following examples are given as being illustrative of the process of the present invention. However, it is to be understood that these examples are merely for purposes of illustration, and are not intended to limit the generally broad scope of the present invention in strict accordance therewith.

EXAMPLE I

In this example, 5 grams of chromite ore which contains 14.4% chromium and 8% iron along with 5 grams of sea nodules which contains 4.1% iron, 1.2% nickel, 0.9% copper, 0.2% cobalt, 23.2% manganese, (17.9% manganese as manganese dioxide) and 2.32% water may be ground to −65 mesh and combined. The combined feedstock may then be treated with 20 cc of concentrated sulfuric acid (90%) and the mixture pugged in a 300 cc beaker. The beaker may then be placed in a pot furnace and the mixture baked at a temperature of 400° C. for a period or 10 minutes. Heating may then be discontinued after substantially all of the water content of the mixture had evaporated off and the excess sulfuric acid is fumed off. The beaker may then be withdrawn from the pot furnace and cooled in air. When the temperature of the beaker reaches about 60° C., the mixture may then be leached with 500 cc of water and agitated with a magnetically stirred bar for a period of about 3 hours while maintaining the temperature at 60° C.

The leach solution may then be filtered to separate the undissolved solids and the filtrate or liquid portion of the pregnant leach liquor is placed in an autoclave. The autoclave is sealed and heated to a temperature of 200° C. and a pressure of 250 pounds per square inch and maintained at this temperature for a period of about 2 hours. During this time, the manganese in the solution will precipitate out as manganese sulfate while the iron which is present in the mixture will precipitate out as ferric oxide. At the end of the aforementioned time period, the autoclave may be opened and the solid iron oxide and manganese sulfate may be separated from the liquid portion of the solution by filtration. The liquid portion of the solution which contained various metals such as copper, nickel, cobalt, chromium, etc., may then be subjected to a solvent extraction with tertiary amines and hydroxy oximes and recovered.

The solid portion of the mixture which may be recovered from the above set forth separation is cooled to room temperature and is leached with an additional amount of water. The manganese sulfate will solubilize while the ferric oxide will remain in an insoluble state. The manganese sulfate solution may be separated from the solid ferric oxide by filtration and the desired manganese may be recovered by electrowinning. Analysis of the leach extraction step of the process hereinbefore set forth will disclose that 93.1% of the chromium may be extracted; and that over 95% of the manganese, iron, nickel, copper and cobalt will also be extracted. The solution may then be treated for chromium recovery and then treated for iron and manganese recovery. The manganese recovery step wil disclose that over 90% of the manganese and iron may be extracted.

EXAMPLE II

To illustrate the necessity for the presence of a chromium-containing reductant compound when treating a manganese bearing source in order to obtain relatively high yields of manganese, an experiment may be repeated in which 5 grams of sea nodules are pugged with 10 cc of concentrated sulfuric acd and the pugged mixture is then baked at a temperature of 400° C. for a period of 10 minutes. The resulting mixture may then be leached with water and the pregnant leach liquor which separates from undissolved solids may be subjected to pressure precipitation in a manner similar to that set forth in Example I above. Analysis of the manganese sulfate solution will disclose that only 55.6% of the manganese is extracted in one instance and 62.5% of the manganese is extracted in the second experiment.

It is therefore obvious from a comparison of Examples I and II that by utilizing the presence of a chromium-containing compound as a reductant in the manganese recovery process, it is possible to obtain over 50% more manganese than is recovered when effecting the treatment process in the absence of the chromium-containing compound.

EXAMPLE III

In this example 5 grams of manganese ore consisting essentially of manganese dioxide and 5 grams of chromite ore are ground to less than 100 mesh, admixed and pugged with 20 cc of concentrated sulfuric acid. The pugged mixture is then placed in an oven and roasted for a period of about 10 minutes at a temperature of 400° C. At the end of this time, the damp solid is recovered and after cooling to a temperature of about 60° C. is leached with 500 cc of water. The leaching is effected during a period of about 3 hours while maintaining the solution in a state of constant agitation. At the end of this period, the solids which comprise tailings are separated from the pregnant leach liquor by filtration and the latter is placed in an autoclave. The autoclave is sealed and heated to a temperature of about 200° C. for a period of 1 hour, during which time the manganese and iron which are in the solution will precipitate out as ferric oxide and manganese sulfate. At the end of the 1-hour period, the solid precipitate is separated from the liquid portion of the mixture by filtration. The liquid portion is then subjected to solvent extraction utilizing various organic solvents such as aromatic amines and hydroxy oximes whereby the various metals which are present in the solution such as chromium, copper, nickel and cobalt are selectively extracted and recovered. The solid precipitate may then be further leached with an additional 500 cc of water at ambient temperature and pressure. During this leaching operation, the manganese sulfate will solubilize while the ferric oxide will remain in a solid form. After separation of the solid ferric oxide from the manganese sulfate solution, the latter is then subjected to an electrowinning process whereby metallic manganese is recovered.

We claim as our invention:

1. In a process for the recovery of manganese values from a manganese bearing source, the steps of:
   a. forming a mixture of said manganese bearing source, sulfuric acid and a reductant comprising a chromium-containing compound in a weight ratio of from about 1:1:1 to about 2:1:10 manganese bearing source, chromium-containing compound and sulfuric acid, respectively;
   b. roasting said mixture at a temperature of from about 200° to about 500° C. for a sufficient time to remove the major portion of its water content and excess sulfuric acid;
   c. leaching the resultant pulp with water at a temperature of from about 25° to about 95° C;
   d. filtering the leach solution to separate undissolved solids from pregnant leach liquor containing dissolved manganese ions and chromium ions;
   e. selectively extracting the chromium ions from said pregnant leach liquor with an organic amine solvent; and
   f. precipitating manganese as solid manganese sulfate from the remaining leach liquor by subjecting the latter to a pressure of from about 50 to about 500 pounds per square inch at a temperature of from about 130° to about 250° C.

2. The process as set forth in claim 1 in which said manganese bearing source is sea nodules.

3. The process as set forth in claim 1 in which said manganese being source is manganese dioxide ore.

4. The process as set forth in claim 1 in which said reductant is chromite ore.

* * * * *